United States Patent [19]

Kurematsu et al.

[11] Patent Number: 5,237,435
[45] Date of Patent: Aug. 17, 1993

[54] MULTICOLOR PROJECTOR EMPLOYING DIFFRACTION GRATING TYPE LIQUID CRYSTAL LIGHT MODULATORS

[75] Inventors: Katsumi Kurematsu, Kawasaki; Shigeru Oshima; Nobuo Minoura, both of Yokohama, all of Japan

[73] Assignee: Canon Kabushiki Kaisha, Ohta, Japan

[21] Appl. No.: 644,932

[22] Filed: Jan. 23, 1991

[30] Foreign Application Priority Data

Jan. 24, 1990 [JP] Japan ................... 2-012521

[51] Int. Cl.⁵ ................... G02F 1/133; G03B 21/26
[52] U.S. Cl. ................... 359/41; 359/53; 359/49; 359/95; 359/495; 359/498; 359/573; 359/574; 353/31; 353/34; 358/61
[58] Field of Search ................... 359/40–42, 359/48, 49, 53, 94, 95, 569–574, 246, 247, 249, 256, 253, 278, 495, 498; 353/31, 34, 122; 358/61, 62, 236

[56] References Cited

U.S. PATENT DOCUMENTS

| | | | |
|---|---|---|---|
| 4,389,096 | 6/1983 | Hori et al. | 359/68 |
| 4,751,509 | 6/1988 | Kubota et al. | 359/45 |
| 4,850,681 | 7/1989 | Yamanobe et al. | 359/95 |
| 4,850,685 | 7/1989 | Kamakura et al. | 359/68 |
| 4,856,869 | 8/1989 | Sakata et al. | 359/94 |
| 4,864,390 | 9/1989 | McKechnie et al. | 359/49 |
| 4,917,465 | 4/1990 | Conner et al. | 359/41 |
| 4,989,076 | 1/1991 | Owada et al. | 359/40 |
| 5,013,141 | 5/1991 | Sakata | 359/94 |
| 5,042,921 | 8/1991 | Sato et al. | 359/49 |
| 5,122,888 | 6/1992 | Iizuka et al. | 359/54 |

*Primary Examiner*—William L. Sikes
*Assistant Examiner*—Tai V. Duong

[57] ABSTRACT

A projector capable of compactizing the structure and improving the efficiency of light utilization is disclosed. The projector has an illuminating system, a light modulation device and a projection optical system. A first and a second lights of mutually different colors are emitted from the illumination optical system. The light modulating device has a first light modulator for modulating the first light according to a first image signal and a second light modulator for modulating the second light according to a second image signal. Each of the first and second light modulators is provided with a grating, a liquid crystal filled in the grooves of the grating and a driver for driving the molecules of the liquid crystal. The driver is adapted to drive the molecules of the liquid crystal in such a manner that the liquid crystal and the grating have mutually substantially matching refractive indexes in a certain state but have mutually unmatched refractive indexes in another state, thereby generating or substantially erasing a diffraction grating by the grating and the liquid crystal. A first and a second images of mutually different colors are projected on a screen by the first and second lights from the first and second light modulators.

9 Claims, 6 Drawing Sheets

FIG. 1
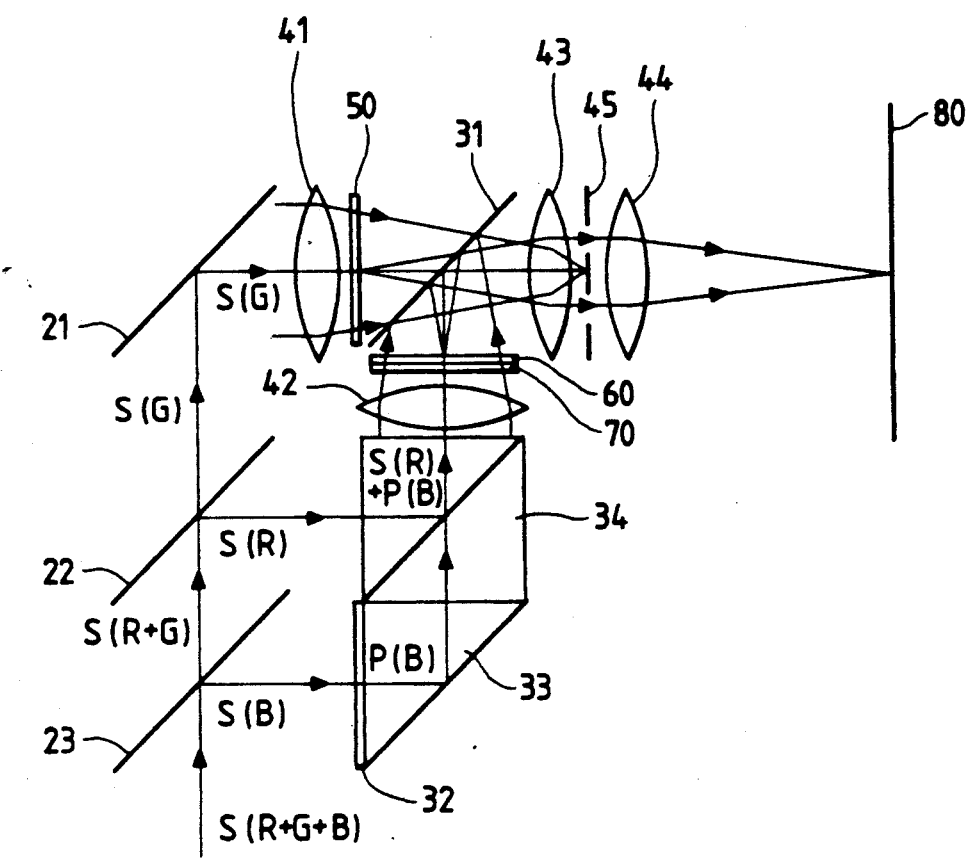
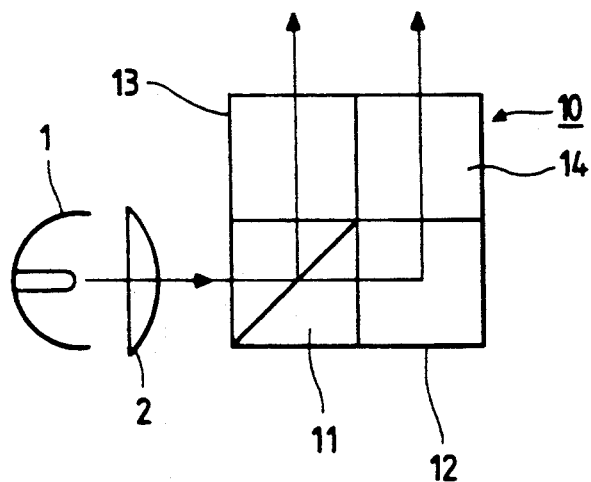

MULTICOLOR PROJECTOR EMPLOYING DIFFRACTION GRATING TYPE LIQUID CRYSTAL LIGHT MODULATORS

BACKGROUND OF THE INVENTION

1. Field of the Invention

The present invention relates to a projector, and more particularly to a projector equipped with a light modulation device utilizing a grating and liquid crystal filled in the grooves of said grating or a grating of refractive index distribution generated in liquid crystal (both types being hereinafter collectively called GLC (grating liquid crystal)).

2. Related Background Art

Projectors utilizing liquid crystal device are already disclosed in the U.S. Pat. Nos. 4,864,390 and 4,962,997, and in the U.S. patent application Ser. No. 147,519, now U.S. Pat. No. 4,989,076, of the present applicant.

On the other hand, the GLC device is already known. The present applicant already disclosed the GLC device and its applications in the U.S. Pat. Nos. 4,729,640, 4,822,146, 4,850,681 and 4,856,869 and in the U.S. patent application Ser. No. 216,127, now U.S. Pat. No. 5,122,888. Similar devices were also disclosed in the Japanese Laid-open Patents Sho54-111846 and Sho55-21001.

Among these references, the last two disclosed projectors equipped with a GLC device and a Schlieren optical system, but either utilizes a single device and forms a diffraction grating from a grating of refractive index distribution generated in the liquid crystal.

Two- or multi-color image display with a single liquid crystal device generally requires a mosaic filter on said device, so that the efficiency of light utilization is not too high. The liquid crystal device may be illuminated with a cathode ray tube as proposed in the Japanese Laid-open Patent Sho54-111846, but such solution is undesirable as the apparatus becomes bulky.

SUMMARY OF THE INVENTION

In consideration of the foregoing, the object of the present invention is to provide a projector capable of providing a bright image without excessive bulkiness of the apparatus.

The above-mentioned object can be attained, according to a first embodiment of the present invention, by a projector provided with an illuminating system for generating first and second lights of mutually different colors; light modulation means including a first light modulator for modulating said first light according to a first image signal and a second light modulator for modulating said second light according to a second image signal; and a projection optical system for projecting first and second images of mutually different colors by means of said first and second lights coming from said first and second light modulators, wherein each of said first and second light modulators is provided with a liquid crystal layer and a driver for driving the molecules of said liquid crystal layer, said driver being adapted to generate or substantially erase a diffraction grating by forming a grating of refractive index distribution in the liquid crystal layer through driving of the molecules thereof.

Also the above-mentioned object can be attained, according to a second embodiment of the present invention, by a projector provided with an illuminating system for generating first and second lights of mutually different colors; light modulation means including a first light modulator for modulating said first light according to a first image signal and a second light modulator for modulating said second light according to a second image signal; and a projection optical system for projecting first and second images of mutually different colors by means of said first and second lights coming from said first and second light modulators, wherein each of said first and second light modulators is provided with a grating, liquid crystal filled in the grooves of said grating, and a driver for driving the molecules of said liquid crystal, and said driver is adapted to drive the molecules of said liquid crystal in such a manner that the refractive index of the liquid crystal substantially matches that of the grating in a certain state but does not match that of the grating in another state, thereby generating or substantially erasing a diffraction grating from said grating and liquid crystal.

In either embodiment, said projection optical system may be composed of a compound optical system including a first projection lens system for projecting said first image with the first light coming from said first light modulator and a second projection lens system for projecting said second image with the second light coming from said second light modulator, or of a single projection lens system for receiving said first and second lights from said first and second light modulators and projecting said first and second images.

Preferably said projection optical system is provided with masking means for intercepting either of the 0-th order light and 1st-order diffracted light and transmitting the other, among said first and second lights from said first and second light modulators, and constitutes a Schlieren optical system. For example, when said projection optical system constitutes a compound optical system, said masking means has first and second masks, which are respectively provided in the optical paths of said first and second lights.

Said illuminating system is adapted to orient the polarizing plane of said first light substantially same as the direction of grooves of said grating of said first light modulator and the polarizing plane of said second light substantially same as the direction of grooves of said grating of said second light modulator, and directs said polarized first and second lights toward said first and second light modulators. Said first and second light modulators are adapted, in said another state, to align said liquid crystal molecules along the grooves of said gratings. For compactization of the apparatus, said first and second light modulators are positioned mutually closely in a common optical path, and are so arranged that the directions of grooves of said gratings are mutually substantially perpendicular, and said illuminating system is so constructed that the polarizing planes of said first and second lights are mutually substantially perpendicular. Said first and second lights are advantageously selected red and blue, respectively.

Preferably said illuminating system generates said first and second lights by separating colors of the light from a light source, and a dichroic mirror, for example, is employed for this purpose.

In case said first and second light modulators are mutually close but do not mutually overlap, said projection optical system is provided with a dichroic mirror for synthesizing said first and second lights from said first and second light modulators, and a projection lens system for receiving said first and second lights from said mirror.

In a preferred improvement of said second embodiment, said illuminating system generates a third light of a color different from those of said first and second lights. Also said light modulation means has a third light modulator for modulating said third light according to a third image signal. Said third light modulator is equipped with a third grating, third liquid crystal filled in the grooves of said third grating, and a third driver for driving the molecules of said third liquid crystal, said third driver being adapted to drive the molecules of said third liquid crystal in such a manner that the refractive index thereof substantially matches that of the third grating in a certain state but does not match that of the third grating in another state, thereby generating or substantially erasing a third diffraction grating by the third grating and the third liquid crystal. Said projection optical system is adapted to project a third image of a color different from those of said first and second lights, by said third light from said third light modulator, and superposes said third image with said first and second images.

Also in this structure, said illuminating system is provided with a light source emitting white light, a conversion system for converting said white light into a polarized light, and a color separating system for separating said polarized light into colored lights of red, green and blue thereby generating said first, second and third lights.

When said illuminating system is used, said first, second and third light modulators are positioned respectively in mutually different first, second and third optical paths between said illuminating system and said projection optical system, and said illuminating system directs said first, second and third lights, coming from said color separating system, respectively toward said first, second and third optical paths.

Also said projection optical system is provided with a color synthesizing system, for example including a pair of mutually crossing dichroic mirrors, for synthesizing the first, second and third modulated lights coming from said first, second and third light modulators.

In another embodiment employing said illuminating system, said first and second light modulators are positioned in a common optical path which is present between said illuminating system and said projection optical system and which is different from the optical path for said third light modulator. Said first and second light modulators are so arranged that the directions of grooves of said gratings are mutually substantially perpendicular, and are adapted to orient the liquid crystal molecules along the grooves of said gratings in said another state. Also said illuminating system rotates the polarizing plane of either of said first and second lights substantially perpendicularly to that of the other thereby orienting the polarizing plane of the first light substantially in the direction of grooves of said grating of said first light modulator while orienting the polarizing plane of the second light substantially in the direction of grooves of said grating of said second light modulator, and directs said first and second lights toward said common optical path and said third light toward the optical path in which said third light modulator is positioned. In this structure said first and second light modulators can be constructed integrally. Also the color synthesizing system of said projection optical system can be composed of a single dichroic mirror for synthesizing the first, second and third modulated lights coming from said first, second and third light modulators.

Also in this structure, said illuminating system has a ½ wavelength plate for example in the path of said first light from said color separating system, thereby rotating the polarizing plane of said first light with respect to that of said second light. Said system is also provided with an arrangement of a mirror and a polarizing beam splitter, directs said second light toward said polarizing beam splitter and causes said mirror to reflect said first light from said ½ wavelength plate toward said polarizing beam splitter, thereby causing said beam splitter to direct said first and second lights toward said common optical path.

The dichroic mirror employed in the projection optical system of the present invention is adapted to reflect said first and second lights and transmit said third light, or to transmit said first and second lights and reflect said third light.

Preferably said first, second and third lights are respectively selected as blue, red and green.

Also said projection optical system is preferably provided either with a mask for intercepting the 0-th order lights and transmitting the 1st order diffracted lights among the lights coming from said light modulators and a projection lens system for prejecting said image by said 1st order diffracted lights, or with a mask for transmitting the 0-th order lights and intercepting the 1st order diffracted lights and a projection lens system for projecting said image by said 0-th order lights.

Also said illuminating system is provided with an aspherical lens for substantially collimating the white light from said light source and is adapted to direct thus collimated white light toward said conversion system.

Also said illuminating system is either adapted to direct said first, second and third collimated lights from said color separating system toward said first, second and third light modulators, or to direct said first, second and third collimated lights to said first, second and third light modulators while converging said lights on said mask.

The wavelengths $\lambda_R$, $\alpha_G$, $\lambda_B$ respectively of said first, second and third lights, and the grating pitches $W_R$, $W_G$, $W_B$ respectively of said first, second and third light modulators preferably satisfy a relation $\lambda_R/W_R = \lambda_G/W_G = \lambda_B/W_B$. Also said gratings preferably have a sinusoidal or triangular cross-sectional shape. Also said light modulators may be so designed as to reflectively modulate the entering lights.

Another preferred embodiment of the projector of the present invention is provided with a light source unit including a light source emitting a white light and polarizing conversion means for converting said white light into a polarized white light; color separating optical means for separating said polarized white light into colored lights of red, green and blue; three GLC devices for respectively modulating said colored lights according to red, green and blue components of an image signal; color synthesizing optical means for synthesizing thus modulated colored lights; and projection optical means based on a Schlieren optical system for enlarged projection of images represented by said synthesized colored lights onto a screen.

Also arbitrary two of said GLC devices may be mutually superposed in such a manner that the directions of grooves are mutually perpendicular, and an optical component for rotating, by 90°, the polarizing plane of one of two colored lights said color separating optical means.

Said two GLC devices may be integrally constructed in mutually superposed manner.

Said superposed two GLC devices may be those for modulating the red and blue colored lights.

Also said three GLC devices may be operated in the normally open mode.

Also said three GLC devices may be operated in the normally open mode, and the output mask constituting the Schlieren optical system may have a cross-shaped aperature.

Also the color synthesizing optical means may be composed of a dichroic mirror transmitting P-polarized colored lights.

Also said three GLC devices may be provided with grooves of pitches which are respectively proportional to the wavelengths of the modulated colored lights.

The brightness of the images projected in magnified manner on the screen can be elevated by separating the polarized white light from the light source unit into colored lights of red, green and blue, and modulating said colored lights with three GLC devices respectively according to the red, green and blue components of the image signal. Also said images can be improved in contrast by the use of a Schlieren optical system, as said colored lights corresponding to the dark areas of said images are completely intercepted by the output mask and do not reach the screen.

The GLC device has a property of transmitting a polarized light of which polarizing plane is perpendicular to the direction of grooves. Therefore, independent modulations of said colored lights are still possible even when arbitrary two said three GLC devices are mutually superposed, if the directions of grooves of said two GLC devices are selected mutually perpendicularly and the polarizing planes of the colored lights to be modulated are also selected mutually perpendicular.

Said superposed two GLC devices can independently modulate said colored lights as the liquid crystals can be independently driven even when said devices are constructed integrally.

The superposition of the GLC devices for modulating the red and blue colored lights allows to reduce the eventual interference and crosstalk between said lights, as they are mutually separated in the wavelength ranges.

Also the operation of said three GLC devices in the normally open mode enables projection of an ordinary color image in magnified manner on the screen, as said colored lights can be modulated without inversion of black and white.

Also since the two colored lights modulated by the aforementioned two superposed GLC devices have mutually perpendicular polarizing planes, the output mask may have a cross-shaped aperture in order to efficiently transmit said colored lights corresponding to the bright areas of the images.

In case of synthesizing the colored lights with dichroic mirrors, they are preferably so used as to transmit the P-polarized colored lights in order to reduce the loss in light amount in synthesis, as dichroic mirrors transmit the P-polarized light more efficiently than S-polarized light.

As the diffraction angle of a colored light in a GLC device is proportional to the wavelength of said colored light and inversely proportional to the pitch of the grooves, the diffraction angles of said colored lights in said three GLC devices can be made same by selecting the pitches of said grooves in proportion to the wavelengths of said colored lights.

BRIEF DESCRIPTION OF THE DRAWINGS

FIG. 1 is a schematic view showing principal parts of a first embodiment of the liquid crystal projector of the present invention;

DESCRIPTION OF THE PREFERRED EMBODIMENTS

Now the present invention will be clarified in detail by preferred embodiments thereof shown in the attached drawings.

Figure 2:
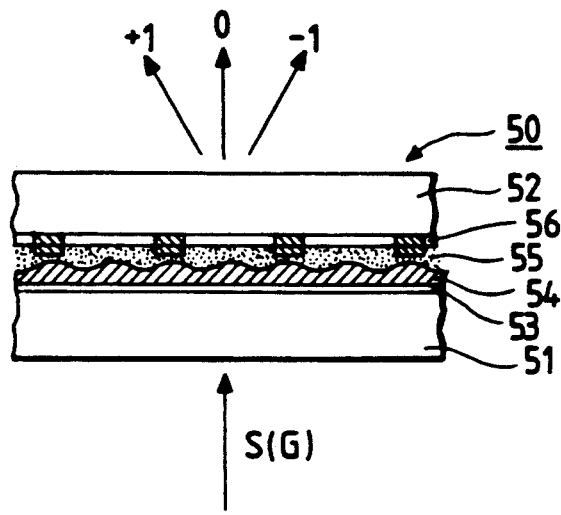
FIG. 2 is a lateral cross-sectional view of a first GLC device 50 shown in FIG. 1.
Figure 3:
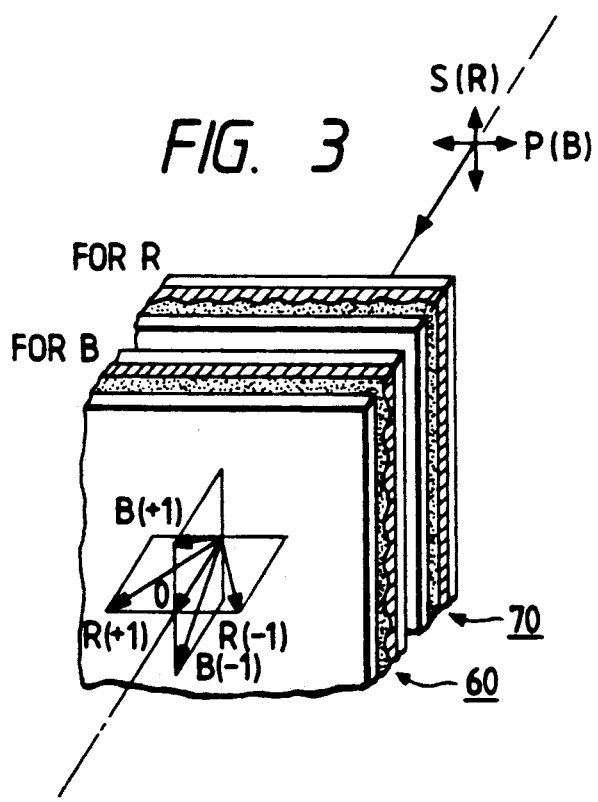
FIG. 3 is a perspective view of second and third GLC devices 60,70 shown in FIG. 1.
Figure 4A:
FIGS. 4A and 4B are views showing examples of pattern of an output mask 45 shown in FIG. 1.
Figure 4B:

FIG. 1 is a schematic view of a first embodiment of the liquid crystal projector of the present invention; FIG. 2 is a lateral cross-sectional view of a first GLC device 50 shown in FIG. 1; FIG. 3 is a perspective view of second and third GLC devices 60, 70 shown in FIG. 1; FIGS. 4A and 4B are views showing examples of the pattern of an output mask 45 shown in FIG. 1.

Said liquid crystal projector is provided with a light source unit consisting of a light source 1, an aspherical condenser lens 2 and a polarizing module 10; color separating optical means consisting of a second polarizing beam splitter 21 and first and second dichroic mirrors 22, 23; color synthesizing optical means consisting of a third dichroic mirror 31, a $\lambda/2$ optical phase plate 32, a prism 33 and a third polarizing beam splitter 34; projection optical means based on Schlieren optical system consisting of first and second Schlieren lenses 41, 42, first and second projection lenses 43, 44 and an output mask 45; first, second and third GLC devices 50, 60 70; and a screen 80.

The polarizing module 10 of the light source unit was reported as C-34 in the Society for Electric and Information Communication, 1989 Fall Convention, and consists of a first polarizing beam splitter 11, first and second right-angled prisms 12, 13, and a cube prism 14. White light emitted by the light source 1 consisting of a high-luminocity high color-fidelity lamp such as a metal halide lamp or a xenon lamp is converted into a parallel white light beam by the aspherical condenser lens 2, then converted by the polarizing module 10 into a polarized white light having a polarizing plane perpendicular to the plane of drawing (hereinafter called $S(R+G+B)$ light as it is S-polarized to the first, second and third polarizing beam splitters 11, 21, 34), and directed to the second dichroic mirror 23. Also polarizing modules disclosed in the aforementioned U.S. patent application Ser. No. 147,519 and in the U.S. Pat. No. 4,864,390 can be used for this purpose.

The second dichroic mirror 23 of the color separating optical means has the property to reflect the blue light ("S(B) light") of said S(R+G+B) light and transmit the yellow light ("S(R+G) light") thereof. The first dichroic mirror 22 has the property to reflect the red light ("S(R) light") of said S(R+G) light and transmit the green light ("S(G) light") thereof.

The $\lambda/2$ optical phase plate 32 of the color synthesizing optical means rotates the polarizing plane of said S(B) light by 90° thereby converting it into a P-polarized light ("P(B) light"). The third polarizing beam splitter 34 has an action plane capable of transmitting said P(B) light and reflecting said S(R) light, and synthesizes said lights (synthesized lights being represented as "S(R)+P(B)" light). The third dichroic mirror 31 has the property to reflect said S(R)+P(B) light and transmit said S(G) light.

FIG. 2 shows the first GLC device 50, which is provided, between first and second glass substrates 51, 52, with a common electrode 53, a groove layer 54, a liquid crystal layer 55 in which molecules of liquid crystal are filled in the layer 54, and a thin film transistor (TFT) layer 56 consisting of thin film transistors, row electrodes and column electrodes, and modulates said S(G) light according to the green component of the image signal. The grooves of said groove layer 54 are formed in a direction along the polarizing plane of said S(G) light. The modulation of light is achieved by moving the molecules of liquid crystal by the electrodes 53, 56.

Said first GLC device 50 functions in the normally open mode. In a pixel where the image signal contains green component, a voltage is applied by the TFT layer 56 and the common electrode 53 across a corresponding portion of the liquid crystal layer 55 to vary the refractive index in said portion, thereby generating a difference in the refractive index between the liquid crystal layer 55 and the groove layer 54. Consequently said S(G) light irradiating said portion is diffracted in a direction perpendicular to the direction of said grooves, and emerges from the first GLC device 50 as $\pm 1$st-order diffracted lights G(+1), G(−1), 2nd-order diffracted lights, ..., n-th order diffracted lights. On the other hand, in a pixel where the image signal does not contain green component, no voltage is applied across the portion of the liquid crystal layer 55 corresponding to said pixel, so that no difference in refractive index is generated between the liquid crystal layer 55 and the groove layer 54. Consequently the S(G) light irradiating said portion is transmitted by the first GLC device 50 and emerges therefrom in the state of 0th order light.

The second and third GLC devices 60, 70 shown in FIG. 1 are respectively constructed similarly to the first GLC device 50 shown in FIG. 2, but are mutually superposed, as shown in FIG. 3, in such a manner that the directions of grooves are mutually perpendicular.

In GLC device, since the liquid crystal molecules are oriented along the grooves, the light diffraction by the difference in refractive index between the liquid crystal layer and the groove layer takes place only on a light polarized along said grooves, and a light polarized perpendicularly is not diffracted but merely transmitted (cf. U.S. Pat. No. 4,251,137). Consequently, among said S(R)+P(B) light entering the second and third GLC devices 60, 70 (cf. FIG. 1), the S(R) light is modulated by the third GLC device 70 into a 0th order light, $\pm 1$st-order diffracted light (R(+1), R(−1)), and higher-order diffracted lights according to the red component of said image signal, but the P(B) light is merely transmitted as the polarizing plane thereof is perpendicular to the direction of grooves of said third GLC device 70. In the second GLC device 60, said 0-th order light, $\pm 1$st-order diffracted lights and other higher-order diffracted lights are transmitted since the polarizing plane thereof is perpendicular to the direction of grooves of said device 60, but the P(B) light is modulated therein into a 0-th order light, $\pm 1$st-order diffracted lights (B(+1), B(−1)) and higher-order diffracted lights according to the blue component of said image signal. As a result, said S(R) light and P(B) light are independently modulated, respectively according to the red and blue components of said image signal, without mutual interference or crosstalk.

The second and third GLC devices 60, 70 function in the normally open mode, like the first GLC device 50. The groove layers of said first, second and third GLC devices 50, 60, 70 have a sinusoidal cross section, in order to suppress color shifts (cf. Optics Communications, 18, 3 (August 1989)).

Besides, the pitches of the grooves of said first, second and third GLC devices 50, 60, 70 are determined in the following manner.

In a GLC device, there approximately stands a following relation among the diffraction angle $\alpha_n$ (n indicating the order of diffraction), wavelength $\lambda$ of light, and pitch w of the grooves:

$$\alpha_n \approx n \times \lambda / w \; (n=0, \pm 1, \pm 2, \ldots) \quad (1).$$

Consequently same diffraction angles $\alpha_n$ can be obtained in all the GLC devices, 50, 60, 70 by selecting the groove pitches $W_G$, $W_B$, $W_R$ thereof in proportion to the wavelengths $\lambda_G$, $\lambda_B$, $\lambda_R$ of the S(G), P(B) and S(R) lights modulated therein, so as to satisfy a relation $\lambda_G/W_G \approx \lambda_B/W_B \approx \alpha_R/W_R$. Therefore a single output mask 45 can be employed in the projection optical means as shown in FIG. 1.

Said mask 45 has a cross-shaped aperture as exemplified in FIGS. 4A and 4B. In FIG. 4A, said aperture is formed by mutually communicating slits, whereas, in FIG. 4B, it is formed by separate slits having semicircular ends. Said mask 45 intercepts the 0-th order lights of said lights S(G), P(B) and S(R) emerging from the first, second and third GLC devices 50, 60, 70. Thus, in a pixel corresponding to a dark area of the image signal, since no diffraction takes place in the first, second or third GLC device 50, 60, 70 as explained the 0-th order lights emerging from the first projection lens 43 are entirely intercepted by the mask 45 to obtain a dark image on the screen (cf. FIG. 1). On the other hand, in a pixel corresponding to a bright area of said image signal, said lights S(G), P(B) and S(R) are respectively diffracted in the first, second and third GLC devices 50, 60, 70 according to the green, blue and red components of the image signal and emerge with $\pm 1$st-order diffracted components, which are transmitted by the aperture of the mask 45 to provide a bright image on the screen 80. Said aperture of the mask 45 is cross-shaped because the $\pm 1$st-order diffracted lights of the P(B) and S(R) lights emerging from the second and third GLC devices 60, 70 are mutually perpendicular as shown in FIG. 3.

Consequently, in the present embodiment, a Schlieren optical system is composed of the first and second Schlieren lenses 41, 42, first projection lens 43 and output mask 45.

In the following there will be explained the function of the liquid crystal projector shown in FIG. 1.

Among the S(R+G+B) light emitted from the polarizing module 10 of the light source unit, the S(B) light is rectangularly reflected by the second dichroic mirror 23 to be incident on the α/2 optical phase plate 32. Among the S(R+G) light transmitted by said second dichroic mirror 23, the S(R) light is rectangularly reflected by the first dichroic mirror 22 to be incident on the third polarizing beam splitter 34. The S(G) light transmitted by the first dichroic mirror 22 is rectangularly reflected by the second polarizing beam splitter 21 with an enhanced level of polarization and enters the first Schlieren lens 41. Consequently said S(R+G+B) light is color-separated into said lights S(B), S(R) and S(G), while retaining the polarized character. Said S(B) light is converted into the P(B) light by the rotation of the polarizing plane by 90° in the λ/2 optical phase plate 32 and enters the prism 33.

Said P(B) light is rectangularly reflected by the prism 33 to the third polarizing beam splitter 34. As the action plane (light splitting plane) thereof transmits the P-polarized light but reflects the S-polarized light, said P(B) light is transmitted by said plane while said S(R) light is reflected thereby. Consequently the second Schlieren lens 42 receives the S(R)+P(B) light synthesized from the S-polarized S(R) light and the P-polarized P(B) light.

The S(G) light emerging from the first Schlieren lens 41 is modulated in the first GLC device 50 according to the green component of the image signal as explained before and enters the third dichroic mirror 31. Also said S(R)+P(B) light emerging from the second Schlieren lens 42 is subjected to independent modulations in the third and second GLC devices 70, 60 respectively according to the red and blue components of said image signal as explained before, and enters the third dichroic mirror 31.

The S(G) light and the S(R)+P(B) light, modulated in the first, second and third GLC devices 50, 60, 70, are synthesized by transmission of the former and rectangular reflection of the latter in the third dichroic mirror 31, and are projected through the first projection lens 43, output mask 45 and second projection lens 44 onto the screen 80. Thus a magnified color image is projected on said screen 80.

The present embodiment has the following effects because of the above-explained structure:

(1) The efficiency of light utilization is very high, because the white light from the light source 1 is converted into the polarized white light without loss, and the color separating optical system and the color synthesizing optical system are also basically free from loss of said polarized white light;

(2) The first, second and third GLC devices 50, 60, 70 are free from heat generation by light absorption, since they do not require light absorbing members such as polarizing filters. Thus there can be used light of a very high intensity, realizing a high luminocity of the projected image;

(3) Use of a Schlieren optical system allows to significantly reduce the luminance of the dark areas of the image, thereby improving the contrast thereof;

(4) As the color synthesizing optical system can be composed solely of the third dichroic mirror 31, the rear focal length of the first projection lens 43 can be shortened, whereby the entire projector can be compactized;

(5) The second and third GLC devices 60, 70 can be constructed in superposed manner, which also contributes to the compactization of the projector;

(6) Same light diffraction angles can be obtained in the first, second and third GLC devices 50, 60, 70 by selecting the ratio of groove pitches thereof same as that of wavelengths of the lights S(G), P(B) and S(R) respectively modulated by said devices, so that only one output mask 45 is required;

(7) Superposed structure of the second and third GLC devices 60, 70 for modulating the P(B) and S(R) lights allows to prevent the interference and crosstalk of said lights as they are distant in wavelength regions.

Figure 5:
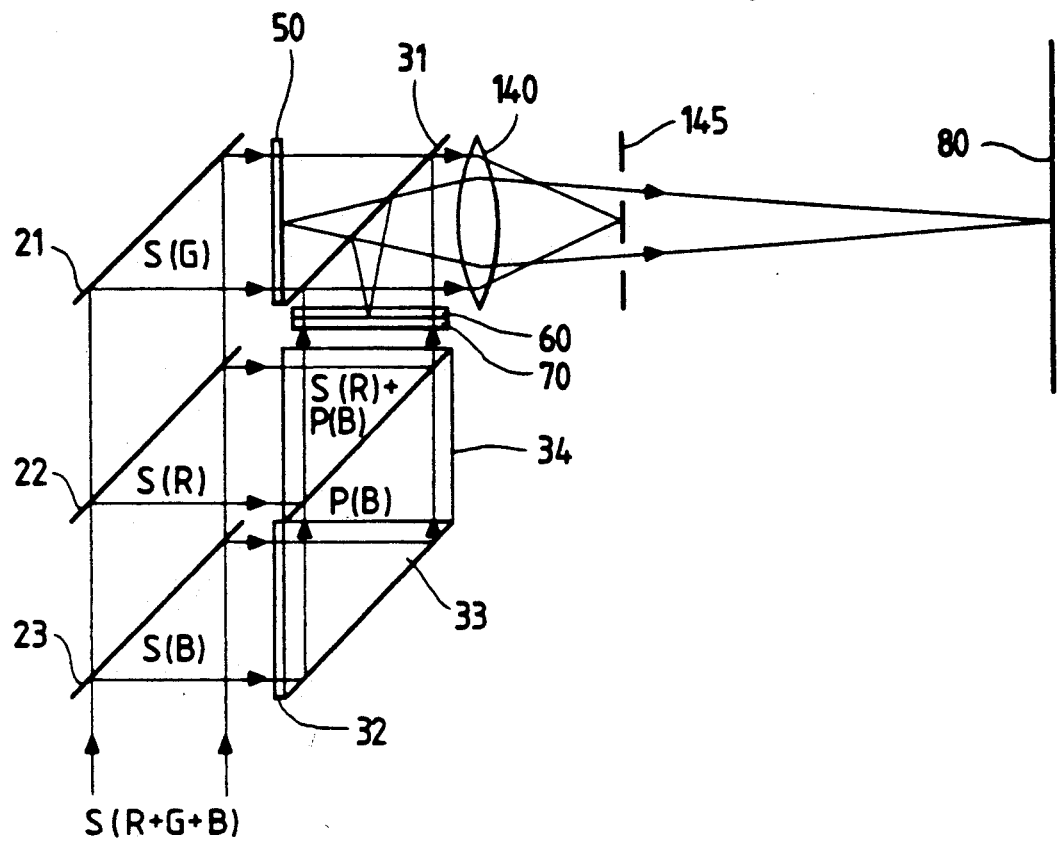
FIG. 5 is a schematic view showing principal parts of a second embodiment of the liquid crystal projector of the present invention.

FIG. 5 is a schematic view of a second embodiment of the liquid crystal projector of the present invention.

Said embodiment is different from that shown in FIG. 1, in that the projection optical system employing a Schlieren optical system is composed of a projection lens 140, serving also as a Schlieren lens, and an output mask 145 (wherein said lens 140 and mask 145 at the same time constitute a Schlieren optical system).

A S(R+G+B) light emitted by a polarizing module of light source unit (not shown) is color-separated into S(G), S(R) and S(B) lights, by color separating optical means composed of a second polarizing beam splitter 21 and first and second dichroic mirrors 22, 23. Said S(B) light is converted into a P(B) light by the rotation by 90° of the polarizing plane by the λ/2 optical phase plate 32, then perpendicularly reflected by the prism 33 and is synthesized with said S(R) light in the third polarizing beam splitter 34 to obtain a S(R)+P(B) light.

Said S(G), P(B) and S(R) lights are modulated in the first, second and third GLC devices 50, 60, 70 according to the green, blue and red components of the image signal, in a similar manner as those shown in FIG. 1.

The modulated S(G), P(B) and S(R) lights are synthesizing in the third dichroic mirror 31, and are projected through the projection lens 140 and the output mask 145 onto the screen 80. The 0-th order lights of said S(G), P(B) and S(R) lights emerging from the first, second and third GLC devices 50, 60, 70 are converged by the projection lens 140 to the central part of the output mask 145 and are intercepted by said mask 145. On the other hand, the ±1st-order diffracted lights of said S(G), P(B) and S(R) lights are converged, through the aperture of the mask 145, onto the screen 80.

The present embodiment provides, by a single projection lens 140, same advantages as those of the embodiment shown in FIG. 1.

Figure 6:
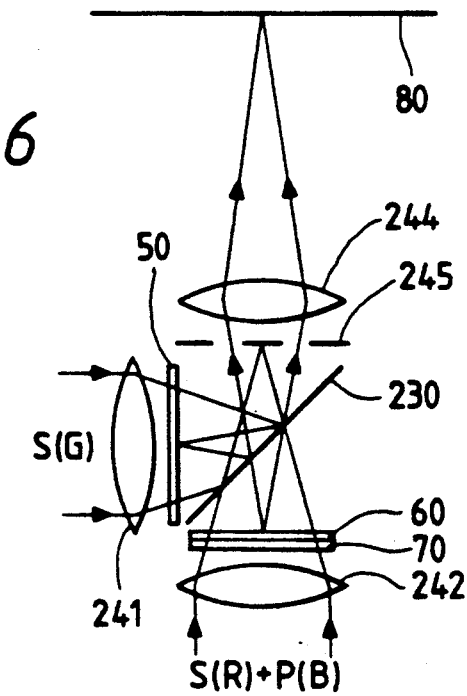
FIG. 6 is a schematic view showing principal parts of a third embodiment of the liquid crystal projector of the present invention.

FIG. 6 is a schematic view of a third embodiment of the liquid crystal projector of the present invention.

This embodiment is different from that shown in FIG. 1 in that the third dichroic mirror 31 shown in FIG. 1 is replaced by a dichroic mirror 230 capable of reflecting the S(G) light and transmitting the S(R)+P(B) light and that the projection optical means utilizing a Schlieren optical system is composed of first and second Schlieren lenses 241, 242, an output mask 245 and a projection lens 244. Said mask 245 is positioned opposite to the screen 80 with respect to the projection lens 244. Other parts are similar to those shown in FIG. 1 and will not, therefore, be explained further.

The S (G) light, and the S(R) and P(B) lights entering the first and second Schlieren lenses 241, 242 are modulated by the first, second and third GLC devices 50, 60, 70 respectively according to the green, blue and red components of the image signal in a similar manner as in the projection shown in FIG. 1, and are synthesized in the dichroic mirror 230 by reflection of said S(G) light and transmission of said S(R)+P(B) light.

The 0-th order lights of said modulated S(G), P(B) and S(R) lights are converged by the first and second Schlieren lenses 241, 242 to the central part of the output mask 245 and intercepted by said mask. On the other hand, the ±1st-order diffracted lights of said S(G), P(B) and S(R) lights enter the projection lens 244 through the aperture of the output mask 245, and are converged on the screen 80 by the projection lens 244. (Schlieren optical system is composed of the first and second Schlieren lenses 241, 242 and the output mask 245.)

In the present embodiment, the use of the dichroic mirror 230 allows to position the screen 80 at the side of the dichroic mirror 230, with respect to the second Schlieren lens 242.

In general, a dichroic mirror shows a better reflectance for the S-polarized light (S(G) or S(R) light) and a better transmittance for the P-polarized light (P(B) light). Consequently, the present embodiment is somewhat superior, in the efficiency of light utilization, to those shown in FIGS. 1 and 5.

Figure 7:
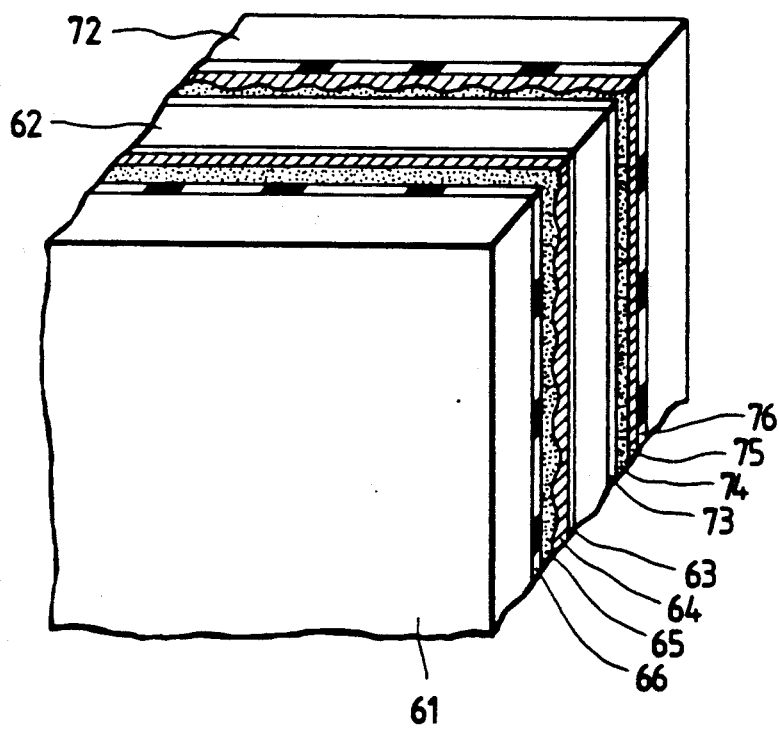
FIG. 7 is a perspective view of an example of the integrated structure of the second and third GLC devices 60, 70 shown in FIG. 1.

FIG. 7 is a perspective view showing an example of integrated structure of the second and third GLC devices 60, 70.

Said integrated GLC devices is provided, between a first glass substrate 61 and a third glass substrate 72 and in the order from the side of the first glass substrate 61, with a first TFT layer 66; a first liquid crystal layer 65; a first groove layer 64; a first common electrode 63; a second glass substrate 62; a second common electrode 73; a second groove layer 74; a second liquid crystal layer 75; and a second TFT layer 76 in mutually adhered manner, wherein the directions of grooves of the first and second groove layers 64, 74 are mutually perpendicular.

The first liquid crystal layer 65, being driven by the first TFT layer 66 and the first common electrode 63, and the second liquid crystal layer 75, driven by the second TFT layer 76 and the second common electrode 73, can be independently operated. Consequently the second and third GLC devices 60, 70 shown in FIGS. 1, 5 and 6 may be replaced by the above-explained integral GLC device.

Such integral GLC device, having fewer interfaces with air in comparison with the superposed second and third GLC devices 60, 70 as shown in FIG. 1, can improve the light transmittance, thereby improving the efficiency of light utilization.

In the foregoing embodiments shown in FIGS. 1, 5 and 6, the second and third GLC devices 60, 70 are mutually superposed. In the following there will be explained an embodiment in which said devices are formed separately.

Figure 8:
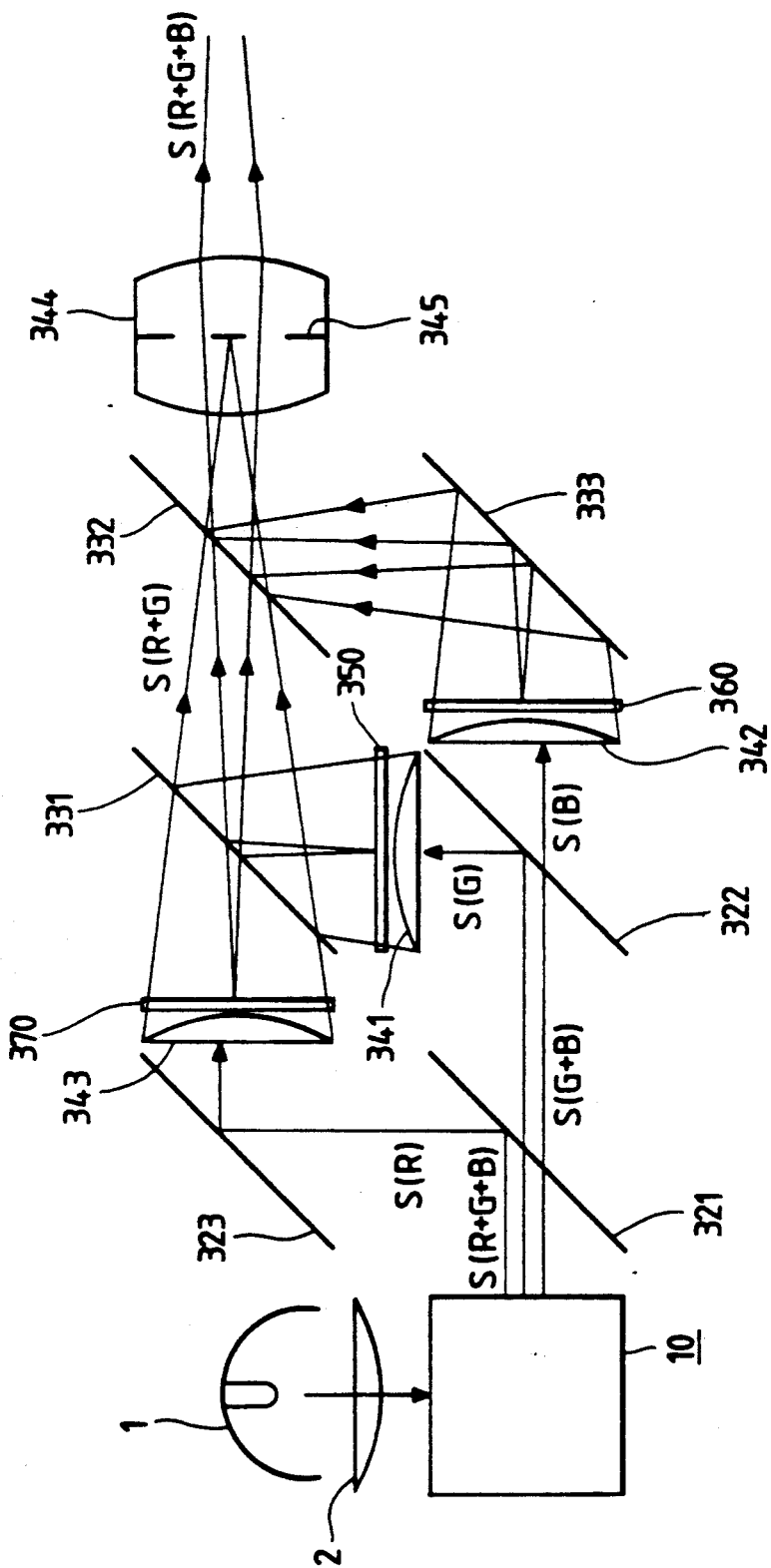
FIG. 8 is a schematic view showing principal parts of a fourth embodiment of the liquid crystal projector of the present invention.

FIG. 8 is a schematic view of a fourth embodiment of the liquid crystal projector of the present invention.

Said projector is provided with a light source unit consisting of a light source 301, an aspherical condenser lens 302 and a polarizing module 310; color separating optical means consisting of first and second dichroic mirrors 321, 322 and a mirror 323; color synthesizing optical means consisting of third and fourth dichroic mirrors 331, 332 and a total-reflection mirror 333; projection optical system utilizing a Schlieren optical system consisting of first, second and third Schlieren lenses 341, 342, 343 and a projection lens 344 incorporating an output mask 345 (said Schlieren optical system being composed of the first, second and third Schlieren lenses 341, 342, 343, projection lens 344 and output mask 345); and first, second and third GLC devices 350, 360, 370.

Among the S(R+G+B) light emitted by the polarizing module 310 of the light source unit, the S(R) light is rectangularly reflected by the first dichroic mirror 321 to be incident on the mirror 323. Also among the cyan light ("S(G+B)") transmitted by the first dichroic mirror 321, the S(G) light is rectangularly reflected by the second dichroic mirror 322 to be incident on the first Schlieren lens 341. The S(B) light transmitted by said second dichroic mirror 322 enters the second Schlieren lens 342. Thus the above-mentioned S(R+G+B) light is color separated into said S(R), S(G) and S(B) lights while maintaining the polarized state thereof, Said S(R) light is again rectangularly reflected by the mirror 323 to be incident on the third Schlieren lens 343.

Said S(G), S(B) and S(R) lights are respectively modulated by the first, second and third GLC devices 350, 360 370 according to the green, blue and red components of the image signal.

Thus modulated S(G) and S(R) lights are respectively reflected and transmitted by the third dichroic mirror 331, thus being synthesized into a S(R+G) light. Said S(R+G) light and the modulated S(B) light are respectively transmitted by the fourth dichroic mirror 332 and rectangularly reflected by the total reflection mirror 333 and again rectangularly reflected by the fourth dichroic mirror 332, thus being synthesized into a S(R+G+B) light.

Said S(R+G+B) light is projected onto a screen (not shown), by the projection lens 344 incorporating the output mask 345. As explained in the foregoing, the 0-th order lights of said modulated S(R), S(G) and S(B) lights are intercepted by the output mask 345, while ±1st-order modulated lights are transmitted through the aperture of the output mask 345, thus forming bright and dark areas on the screen.

Also the present embodiment provides the advantages (1), (2), (3) and (6) of those of the embodiment shown in FIG. 1. Also the present embodiment enables compactization, in comparison with the conventional apparatus in which the GLC device is illuminated with a cathode ray tube.

Figure 9:
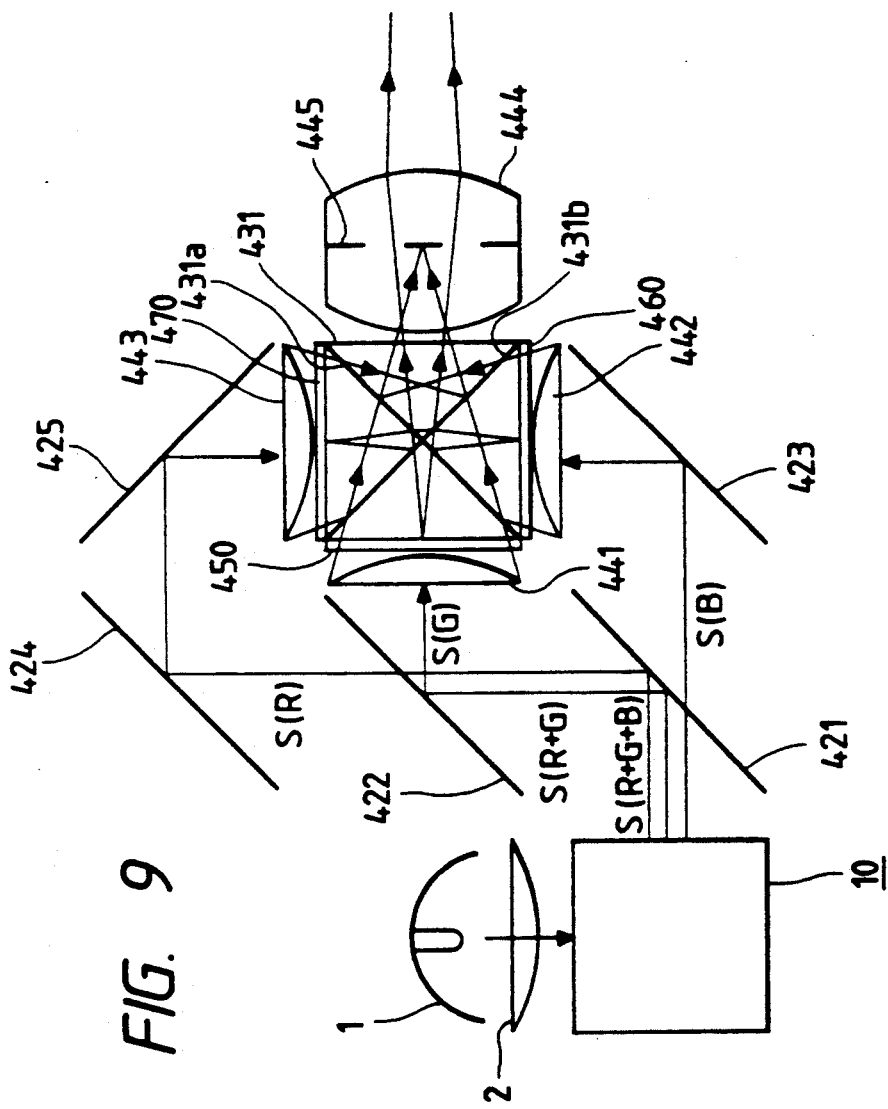
FIG. 9 is a schematic view showing principal parts of a fifth embodiment of the liquid crystal projector of the present invention.

FIG. 9 is a schematic view of a fifth embodiment of the liquid crystal projector of the present invention.

Said projector is provided with a light source unit consisting of a light source 401, an aspherical condenser lens 402 and a polarizing module 410; color separating optical means consisting of first and second dichroic mirrors 421, 422 and first, second and third total-reflection mirrors 423, 424, 425; color synthesizing optical means consisting of a cross dichroic cube 431 having a first dichroic mirror face 431a and a second dichroic mirror face 432a; projection optical means utilizing a Schlieren optical system consisting of first, second and third Schlieren lenses 441, 442, 443 and a projection lens 444 incorporating an output mask 445 (Schlieren optical system being composed of first, second and third Schlieren lenses 441, 442, 443, projection lens 444 and output mask 445); and first, second and third GLC devices 450, 460, 470.

Among a S(R+G+B) light emitted from the polarizing module 410 of the light source unit, the S(B) light is transmitted by the first dichroic mirror 421 and is rectangularly reflected by the first total reflection prism 423 to be incident on the second Schlieren lens 442. Among the S(R+G) light rectangularly reflected by the first dichroic mirror 421, the S(G) light is rectangularly reflected by the second dichroic mirror 422 to be incident on the first Schlieren lens 441. The S(R) light transmitted by the second dichroic mirror 422 is rectangularly reflected by the second total-reflection mirror 424 and again rectangularly reflected by the third total-reflection mirror 425 to be incident on the third Schlieren lens 443. Consequently the S(R+G+B) light is color separated into said S(B), S(G) and S(R) lights while maintaining the polarized state thereof.

Said S(G), S(B) and S(R) lights are respectively modulated by the first, second and third GLC devices 450, 460, 470 according to the green, blue and red components of the image signal.

Thus modulated S(G), S(B) and S(R) lights are synthesized in the cross dichroic cube 431, by reflection of the S(B) light by the first dichroic face 431a, reflection of the S(R) light by the second dichroic face 431b and transmission of the S(G) light by said two faces, and are projected onto the screen (not shown) by the projection lens 444 incorporated the output mask 445. As explained in the foregoing, the 0-th order lights of said modulated S(G), S(B) and S(R) lights are intercepted by the mask 445, while the ±1st-order diffracted lights are transmitted by the aperture of said mask 445 to generate bright and dark areas on the screen.

The present embodiment also provides advantages same as those in the embodiment shown in FIG. 8.

The liquid crystal projector of the present invention is not limited to the foregoing embodiments but may also be constructed in the following manner:

(1) In the projector shown in FIG. 1, 5 or 6, the combination of colored lights to be modulated in the superposed or integrated two GLC devices may be the S(R) and S(G) lights or the S(G) and S(B) lights;

(2) The structure or the optical components used in the light source unit, color separating optical means, color synthesizing optical means and/ or projection optical means according to Schlieren optical system may be replaced by an equivalent structure or equivalent components;

(3) The cross-sectional shape of the groove layers of the GLC devices may be changed to triangular or other shape, or may be changed for each color;

(4) The output mask may be so designed to intercept the ±1st- and higher-order diffracted lights from the GLC devices and transmit the 0-th order lights;

(5) The GLC devices may be operated in a mode inverse to the normally open mode;

(6) The GLC devices may be of a type generating a grating consisting of a refractive index distribution in the liquid crystal layer;

(7) The GLC devices may be of a type for reflective modulation of the incident lights;

(8) A projection lens and/or a mask may be provided for the GLC device for each color;

(9) The GLC devices may be those disclosed in the aforementioned U.S. Patents or Patent Applications.

The projector explained in the foregoing has following advantages.

It is capable of magnified projection of a bright color image with an elevated contrast onto a screen, by the combination of three GLC devices and projection optical means utilizing a Schlieren optical system.

It is also capable of compactizing the structure, by superposing arbitrary two of said three GLC devices, arranging the directions of grooves thereof mutually perpendicularly and also arranging mutually perpendicularly the polarizing planes of colored lights to be modulated by said two GLC devices, thereby achieving independent modulation of said two colored lights.

It is furthermore capable of compactizing the structure and improving the efficiency of light utilization, by integrating said two superposed GLC devices, as said two colored lights can be independently modulated in a similar manner.

It is furthermore capable of reducing interference and crosstalk between said two colored lights and thus obtaining a color image of improved image quality, by selecting red and blue lights, of which wavelength regions are mutually separate, for modulation by the superposed GLC devices.

It is furthermore capable of projecting an ordinary color image, without inversion of black and white, in magnified manner on a screen by operating said three GLC devices in the normally open mode.

It is furthermore capable of effectively intercepting the colored lights corresponding to the dark image areas, by providing the projection optical means with an output mask with a cross-shaped aperture.

It is furthermore capable of improving the efficiency of light utilization, by synthesizing the colored lights with dichroic mirrors capable of transmitted P-polarized colored lights, thereby reducing the loss in light amount at the synthesis.

It is furthermore capable of using only one output mask, by selecting the pitches of grooves in the GLC devices in proportion to the wavelengths of color lights to be modulated therein, thereby obtaining same diffraction angles for the colored lights emerging from said GLC devices.

We claim:

1. A projector comprising
an illumination system including,
   a light source emitting a white light,
   a conversion system for converting said white light into a polarized light, and
   a color separation system for splitting said polarized light into red, green and blue lights for generating first, second and third lights of mutually different colors;
light modulation means including,
   a first light modulator for modulating said first light according to a first image,
   a second light modulator for modulating said second light according to a second image,
   a third light modulator for modulating said third light according to a third image, wherein each of said first, second and third light modulators is provided with a grating including grooves liquid crystal filled in the grooves of said grating and a driver for driving molecules of said liquid crystal, said driver being adapted to drive the molecules of liquid crystal in such a manner that the liquid crystal and the grating have mutually substantially matching refractive indexes in a certain state but have mutually unmatched refractive indexes in another state, thereby generating or substantially erasing a diffraction grating by said grating and said liquid crystal, said first and second light modulators are positioned in a mutually common optical path, different from the optical path in which said third light modulator is positioned, betwen said illuminating system and said projection optical system, are arranged in such a manner that the direction of grooves of said gratings are mutually substantially perpendicular, and are adapted to orient said molecules of the liquid crystal along the grooves of said gratings in said another state;

a projection optical system for projecting a first and second images of mutually different colors by said first and second lights from said first and second light modulators, said projection optical system further adapted to project a third image of a color different from those of said first and second lights, by said third light from said third light modulator, and superposes said third image with said first and second images; and said illuminating system is adapted to rotate the polarizing plane of one of said first and second lights from said color separation system substantially perpendicularly to the polarizing plane of the other, thereby substantially matching the polarizing plane of the first light with the direction of grooves of said grating of said first light modulator and substantially matching the polarizing plane of said second light with the direction of grooves of said grating of said second light modulator, and direct said first and second lights to said common optical path and said third light to said optical path in which said third light modulator is positioned.

2. A projector according to claim 1, wherein said first and second light modulators are integrally constructed.

3. A projector according to claim 1, wherein said projection optical system comprises a color synthesizing system composed of a single dichroic mirror for synthesizing said modulated first, second and third lights from said first, second and third light modulators.

4. A projector according to claim 1, wherein said illuminating system comprises a ½ wavelength plate in the optical path of said first light from said color separation system thereby rotating the polarizing plane of said first light with respect that of said second light, and further comprises an arrangement of a mirror and a polarizing beam splitter thereby directing said second light to said polarizing beam splitter, reflecting said first light from said ½ wavelength plate by said mirror to said polarizing beam splitter and directing said first and second lights by said polarizing beam splitter to said common optical path.

5. A projector according to claim 3, wherein said dichroic mirror is adapted to reflect said first and second lights and transmit said third light.

6. A projector according to claim 3, wherein said dichroic mirror is adapted to transmit said first and second lights and reflect said third light.

7. A projector according to claim 1, wherein said first, second and third lights are respectively blue, red and green.

8. A projector comprising:

an illuminating system for emitting first and second lights of mutually different colors and mutually different polarization planes;

light modulation means including a first light modulator for modulating said first light according to a first image signal and a second light modulator for modulating said second light according to a second image signal, wherein each of said first and second light modulators is provided with a grating including grooves, liquid crystal filled in the grooves of said grating, and a driver for driving molecules of said liquid crystal, said driver is adapted to drive the molecules of liquid crystal in such a manner that the liquid crystal and the grating have mutually substantially matching refractive indexes in a certain state but have mutually unmatched refractive indexes in another state, thereby generating or substantially erasing a diffraction grating by said grating and said liquid crystal; and a projection optical system for projecting first and second images of mutually different colors by said first and second lights from said first and second light modulators, said first and second light modulators are positioned mutually closely in a common optical path and are so arranged that the directions of grooves of said gratings are mutually substantially perpendicular, and said first and second lights have mutually substantially perpendicular polarizing planes, to match with the directions of said grooves of said gratings.

9. A projector according to claim 8, wherein said first and second lights are respectively red and blue.

* * * * *